(12) United States Patent
Amundson

(10) Patent No.: US 10,037,735 B2
(45) Date of Patent: Jul. 31, 2018

(54) ACTIVE MATRIX DISPLAY WITH DUAL DRIVING MODES

(71) Applicant: E INK CORPORATION, Billerica, MA (US)

(72) Inventor: Karl R. Amundson, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 14/080,209

(22) Filed: Nov. 14, 2013

(65) Prior Publication Data

US 2014/0139501 A1    May 22, 2014

Related U.S. Application Data

(60) Provisional application No. 61/727,639, filed on Nov. 16, 2012.

(51) Int. Cl.
*G09G 3/34* (2006.01)
*G02B 26/00* (2006.01)
*G02F 1/167* (2006.01)

(52) U.S. Cl.
CPC .......... *G09G 3/3446* (2013.01); *G09G 3/344* (2013.01); *G02B 26/005* (2013.01); *G02F 2001/1676* (2013.01); *G09G 2300/08* (2013.01); *G09G 2300/0876* (2013.01)

(58) Field of Classification Search
CPC .... G09G 3/344; G09G 3/3655; G09G 3/3446; G09G 2300/08; G09G 2300/0876; G02F 1/136213; G02F 2001/1676; G02B 26/005

USPC .......... 345/107, 211–213; 359/296
See application file for complete search history.

(56) References Cited

U.S. PATENT DOCUMENTS

| 4,132,465 A | 1/1979 | Rode et al. |
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |

(Continued)

FOREIGN PATENT DOCUMENTS

| JP | 2006251093 A | 9/2006 |
| JP | 2007316346 A | 12/2007 |

(Continued)

OTHER PUBLICATIONS

Bach, U., et al., "Nanomaterials-Based Electrochromics for Paper-Quality Displays", Adv. Mater, 14(11), 845 (2002).

(Continued)

*Primary Examiner* — Amr Awad
*Assistant Examiner* — Aaron Midkiff
(74) *Attorney, Agent, or Firm* — Zhen Bao

(57) ABSTRACT

An active matrix electro-optic display (100) includes capacitor electrodes (110, 112) associated with the pixel electrodes (106, 108) so that the pixel electrode and its associated capacitor electrode form a capacitor. The display (100) also includes switching means (120) having one position in which each capacitor electrode (110, 112) is electrically connected to the light-transmissive front electrode (102) of the display (100) and a second position in which each capacitor electrode (110, 112) is electrically connected to a voltage source having a voltage independent of the voltage on the light-transmissive electrode.

11 Claims, 2 Drawing Sheets

(56) References Cited

U.S. PATENT DOCUMENTS

| | | |
|---|---|---|
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,075,502 B1 | 7/2006 | Drzaic et al. |
| 7,106,296 B1 | 9/2006 | Jacobson |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,170,670 B2 | 1/2007 | Webber |
| 7,176,880 B2 | 2/2007 | Amundson et al. |
| 7,193,625 B2 | 3/2007 | Danner et al. |
| 7,202,847 B2 | 4/2007 | Gates |
| 7,236,291 B2 | 6/2007 | Kaga et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,492,339 B2 | 2/2009 | Amundson |
| 7,528,822 B2 | 5/2009 | Amundson et al. |
| 7,535,624 B2 | 5/2009 | Amundson et al. |
| 7,538,757 B2 * | 5/2009 | Zhou et al. ................ 345/107 |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,652,649 B2 * | 1/2010 | Huang ........................ 345/90 |
| 7,679,599 B2 | 3/2010 | Kawai |
| 7,679,814 B2 | 3/2010 | Paolini et al. |
| 7,688,297 B2 | 3/2010 | Zehner et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,952,557 B2 | 5/2011 | Amundson et al. |
| 7,956,841 B2 | 6/2011 | Albert et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,319,759 B2 | 11/2012 | Jacobson et al. |
| 8,340,628 B2 | 12/2012 | Taylor et al. |
| 8,384,658 B2 | 2/2013 | Albert et al. |
| 8,558,783 B2 | 10/2013 | Wilcox et al. |
| 8,558,785 B2 | 10/2013 | Zehner et al. |
| 8,593,396 B2 | 11/2013 | Amundson et al. |
| 8,593,438 B2 | 11/2013 | Komatsu et al. |
| 8,928,562 B2 | 1/2015 | Gates et al. |
| 2003/0102858 A1 | 6/2003 | Jacobson et al. |
| 2005/0057477 A1 | 3/2005 | Yun et al. |
| 2005/0253777 A1 | 11/2005 | Zehner et al. |
| 2006/0059748 A1 | 3/2006 | Wescott et al. |
| 2006/0119753 A1 * | 6/2006 | Luo et al. ................ 349/38 |
| 2006/0284811 A1 | 12/2006 | Huang et al. |
| 2007/0013683 A1 | 1/2007 | Zhou et al. |
| 2007/0091418 A1 | 4/2007 | Danner et al. |
| 2007/0103427 A1 | 5/2007 | Zhou et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0291129 A1 | 11/2008 | Harris et al. |
| 2009/0174651 A1 | 7/2009 | Jacobson et al. |
| 2009/0179923 A1 | 7/2009 | Amundson et al. |
| 2009/0195568 A1 | 8/2009 | Sjodin |
| 2009/0322721 A1 | 12/2009 | Zehner et al. |
| 2010/0220121 A1 | 9/2010 | Zehner et al. |
| 2010/0265561 A1 | 10/2010 | Gates et al. |
| 2011/0057868 A1 * | 3/2011 | Chen ................ G09G 3/3655 345/92 |
| 2011/0141082 A1 * | 6/2011 | Yamazaki ............ G09G 3/3446 345/209 |
| 2011/0149183 A1 * | 6/2011 | Cho .................. G02F 1/133514 349/38 |
| 2011/0193840 A1 | 8/2011 | Amundson |
| 2011/0193841 A1 | 8/2011 | Amundson et al. |
| 2011/0199671 A1 | 8/2011 | Amundson et al. |
| 2011/0205195 A1 | 8/2011 | Komatsu et al. |
| 2011/0279491 A1 * | 11/2011 | Liu et al. ................ 345/691 |
| 2011/0285754 A1 | 11/2011 | Harrington et al. |
| 2012/0092753 A1 * | 4/2012 | Heikenfeld et al. .......... 359/296 |

FOREIGN PATENT DOCUMENTS

| | | |
|---|---|---|
| JP | 2009-300771 | 12/2009 |
| KR | 20070071037 | 7/2007 |

OTHER PUBLICATIONS

Hayes, R.A., et al., "Video-Speed Electronic Paper Based on Electrowetting", Nature, vol. 425, Sep. 25, pp. 383-385 (2003).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal $TiO_2$ Films", Nature, vol. 353, Oct. 24, 1991, 773-740.

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Korean Intellectual Property Office; International Search Report and Written Opinion; PCT/US2013/070226; dated Feb. 17, 2004, dated Feb. 17, 2004.

European Patent Office; Extended European Search Report; EP Appl. No. 13856038.8; dated Apr. 4, 2016, dated Apr. 4, 2016.

* cited by examiner

ACTIVE MATRIX DISPLAY WITH DUAL DRIVING MODES

REFERENCE TO RELATED APPLICATIONS

This application claims benefit of copending Application Ser. No. 61/727,639, filed Nov. 16, 2012.

This application is also related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; and 8,314,784; and U.S. Patent Applications Publication Nos. 2003/0102858; 2005/0122284; 2005/0179642; 2005/0253777; 2007/0091418; 2007/0103427; 2008/0024429; 2008/0024482; 2008/0136774; 2008/0150888; 2008/0291129; 2009/0174651; 2009/0179923; 2009/0195568; 2009/0322721; 2010/0045592; 2010/0220121; 2010/0220122; 2010/0265561; 2011/0187684; 2011/0193840; 2011/0193841; 2011/0199671; and 2011/0285754

The aforementioned patents and applications may hereinafter for convenience collectively be referred to as the "MEDEOD" (MEthods for Driving Electro-Optic Displays) applications. The entire contents of these patents and copending applications, and of all other U.S. patents and published and copending applications mentioned below, are herein incorporated by reference.

BACKGROUND OF INVENTION

This invention relates to active matrix displays, and more particularly to such displays having dual driving modes. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Some of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U. S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. No. 7,075,502 and U.S. Patent Application Publication No. 2007/0109219;
(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,733,311; 7,733,335; 7,729,039; 7,787,169; 7,952,557; and 7,999,787; and U.S. Patent Applications Publication Nos. 2003/0102858; 2005/0122284; 2005/0179642; 2005/0253777; 2006/0139308; 2007/0013683; 2007/0091418; 2007/0103427; 2007/0200874; 2008/0024429; 2008/0024482; 2008/0048969; 2008/0129667; 2008/0136774; 2008/0150888; 2008/0165122; 2008/0211764; 2008/0291129; 2009/0174651; 2009/0179923; 2009/0195568; 2009/0256799; 2009/0322721; 2010/0045592; 2010/0220121; 2010/0220122; 2010/0265561 and 2011/0285754;
(g) Applications of displays; see for example U.S. Pat. Nos. 7,312,784 and 8,009,348; and
(h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

The minimum time for a global refresh of the entire display (hereinafter referred to as the "frame time") is therefore the product of the number of rows and the line address time for each row as defined above. This frame time is limited by (among other variables) the efficiency of the transistors that comprise the active matrix, and this efficiency depends upon the semiconductor material from which the transistors are made.

For certain purposes, it is desirable to be able to drive an active matrix display in at least two different modes. The discussion below will focus on the application of such dual mode driving to electrophoretic displays, as discussed above, but this invention is not limited to such displays and the invention may be used with any of the aforementioned types of display and with liquid crystal and micromechanical (MEMS) displays.

It is known in the prior art to drive electrophoretic displays in a dual mode manner, in which the first mode uses pixel-specific waveforms (i.e., waveforms which vary between individual pixels) to induce electrophoretic motion of pigment particles parallel to the applied field in the manner commonly used to render images. For example, an electrophoretic display may comprise positively charged white (scattering) particles and negatively charged black particles dispersed in a fluid; applying a negative voltage to a backplane pixel electrode will move the white pigment towards the front (viewing) surface of the display and the black pigment towards the back plane to produce a white state of the pixel (as seen through the viewing surface); conversely, applying a positive voltage to a backplane pixel electrode will produce a dark state by inducing motion of the white and black particles in the opposite directions.

In the second mode, rapidly-varying (alternating) voltages are used; see for example, U.S. Pat. Nos. 7,106,296, 7,116,466, 7,259,744, 7,304,787, 7,327,511, 7,583,251, and 7,999,787. In these patents, alternating voltages are used to induce spatially inhomogeneous distributions of particles in the plane of the display, leading to optical states that differ in transparency from states attainable by means of direct current (DC) driving. The frequency of alternating voltages (typically square waves) used to induce such changes of transparency may be in excess of 50 Hz, requiring individual square wave pulses shorter than 10 milliseconds, and frame times of similar duration. Such frame times may be beyond the capability of conventional thin film transistor arrays. In some cases alternating voltage frequencies higher than 1 kHz are required, which are far beyond the present day capabilities of commercial thin film transistor arrays.

Accordingly, the desired, rapidly-changing voltage profile required for the second driving mode may not be available through conventional driving of the backplane, i.e., the desired drive mode may involve frequencies of voltage variation or voltage values that are not accessible through the backplane by means of its row and column drivers. While conventional active matrix display modules are designed for driving in the first mode described above, they may not, therefore, allow for effective driving using the second mode.

The present invention seeks to provide a solution to this problem and thus to provide an electro-optic display, and a method for driving such a display, which permits a rapidly-changing voltage profile to be applied to the pixels of an active matrix display.

SUMMARY OF INVENTION

Accordingly, this invention provides an electro-optic display comprising:
a layer of electro-optic material;
at least one light-transmissive electrode disposed on one side of the layer of electro-optic material;
a plurality of pixel electrodes disposed on the opposed side of the layer of electro-optic material from the at least one light-transmissive electrode;
a plurality of capacitor electrodes, each capacitor electrode being associated with one of the plurality of pixel electrodes such that the pixel electrode and its associated capacitor electrode form a capacitor; and
switching means having a first position in which each capacitor electrode is electrically connected to the light-transmissive electrode and a second position in which each capacitor electrode is electrically connected to a voltage source having a voltage independent of the voltage on the light transmissive electrode.

In one form of this electro-optic display, in the second position of the switching means, each capacitor electrode is connected to a source of constant voltage, such as ground.

In one form of the electro-optic display of the present invention, each pixel electrode is connected to the drain of a transistor that is also connected to a source line and a gate line.

In the electro-optic display of the present invention, the portion of the pixel electrode which lies adjacent the electro-optic medium (and thus applies an electric field to this medium when the display is operating) need not be the same portion that forms a capacitor with the capacitor electrode, although the two portions of the pixel electrode (if different) must be electrically connected to one another. In particular, the electro-optic display of the present invention may make use of so-called "buried transistors" (see for example U.S. Pat. No. 7,176,880) in which each pixel electrode is in two portions lying on opposed sides of a layer of dielectric material, a first portion lying adjacent the layer of electro-optic material, and a second portion being connected to the drain or source of an associated transistor, and connected to the first portion by means of a conductive via passing through the layer of dielectric material.

The present invention also provides a method for addressing an electro-optic display comprising:
a layer of electro-optic material;
at least one light-transmissive electrode disposed on one side of the layer of electro-optic material;
a plurality of pixel electrodes disposed on the opposed side of the layer of electro-optic material from the at least one light-transmissive electrode;
a plurality of capacitor electrodes, each capacitor electrode being associated with one of the plurality of pixel electrodes such that the pixel electrode and its associated capacitor electrode form a capacitor; and
switching means having a first position in which each capacitor electrode is electrically connected to the light-transmissive electrode and a second position in which each capacitor electrode is electrically connected to a voltage source having a voltage independent of the voltage on the light transmissive electrode,
the method comprising:
(i) with the switching means in its first position, applying a voltage to the pixel electrode such that the pixel electrode and the light-transmissive electrode are at substantially the same potential; and
(ii) with the switching means in its second position, applying a voltage to the pixel electrode such that the light-transmissive electrode and the pixel electrode are not at the same potential.

In a preferred form of this method of the present invention, each pixel electrode is connected to the drain of a transistor that is also connected to a source line and a gate line, and in step (i) of the method the voltage is applied to the pixel electrode through the transistor via the source line.

The display and method of the present invention may make use of any of the types of bistable electro-optic material discussed above. Thus, for example, in the display and method of the present invention the electro-optic material may comprise a rotating bichromal member, electrochromic or electro-wetting material. Alternatively, the electro-optic material may comprise an electrophoretic material comprising a plurality of electrically charged particles disposed in a fluid and capable of moving through the fluid under the influence of an electric field. The electrically charged particles and the fluid may be confined within a plurality of capsules or microcells, or may be present as a plurality of discrete droplets surrounded by a continuous phase comprising a polymeric material. The fluid may be liquid or gaseous.

The displays and methods of the present invention may be used in any application in which prior art electro-optic displays have been used. Thus, for example, the present displays and methods may be used in electronic book readers, portable computers, tablet computers, cellular telephones, smart cards, signs, watches, shelf labels, variable transmission windows and flash drives.

DETAILED DESCRIPTION

As indicated above, the present invention provides a dual drive mode electro-optic display and a corresponding driving method. The present invention allows for driving an active matrix display in two different modes. In the first mode, differing voltage pulses (or waveforms) may be provided to each individual pixel electrode of the display within a frame time (as defined above), while in the second mode a plurality of pixels comprising more than one row of the display may be addressed simultaneously with a particular voltage or waveform. Optionally, every pixel in the entire display may be addressed simultaneously in the second driving mode, but this is not a requirement of the present invention. The present invention can also provide means for switching the mode of display addressing so that it can be alternately driven in the first and second modes in distinct time segments.

Figure 1:
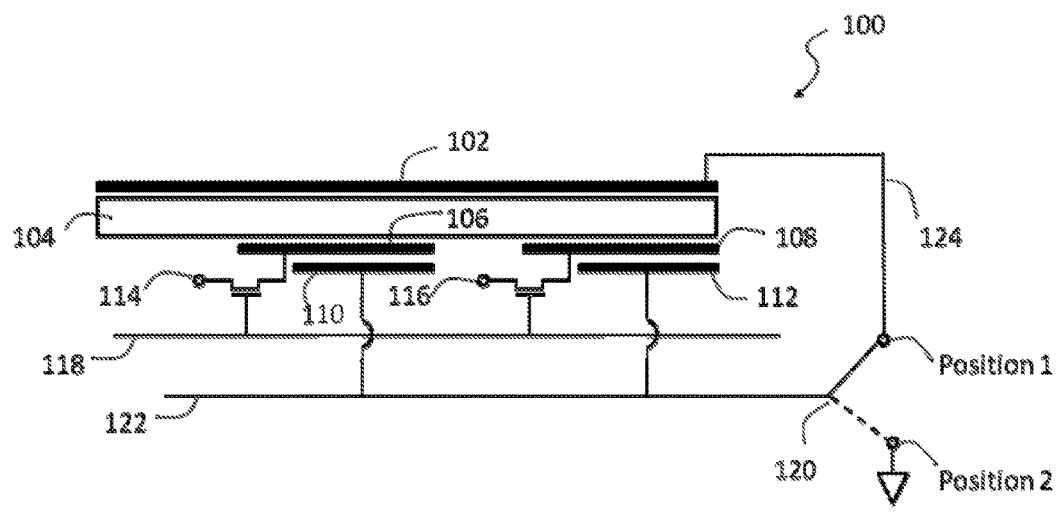
FIG. 1 is a schematic cross-section through a portion of a thin film transistor active matrix back plane and associated dual mode drive circuitry of the present invention.

FIG. 1 shows a schematic cross-section through part of a display (generally designated 100) comprising a light-transmissive electrode 102 that may be transparent or translucent; the electrode 102 has the conventional form of a common front plane electrode extending across the entire display and forming a viewing surface through which a user views the display 100. The display further comprises a layer of electro-optic material 104, and, on the opposed side of layer 104 from electrode 102, an active matrix backplane comprising an array of pixel electrodes (of which only two are shown, designated 106 and 108 respectively) driven by source lines 114 and 116 through thin film transistors are switched by a gate line 118. Capacitor electrodes 110 and 112 are associated with and lie proximate pixel electrodes 106 and 108 respectively so that each capacitor electrode forms a capacitor with its associated pixel electrode. (As previously noted, the portion of the pixel electrode which lies adjacent the electro-optic medium (and thus applies an electric field to this medium when the display is operating) need not be the same portion that forms a capacitor with the capacitor electrode, although the two portions of the pixel electrode (if different) must be electrically connected to one another; thus, the display 100 shown in FIG. 1 may be modified so that the capacitor electrodes 110 and 112 can lie proximate conductors in contact with the pixel electrodes 106 and 108.) A switching means in the form of a two-position switch 120 connects capacitor electrodes 110 and 112 either to a voltage supply line 124 connected to the electrode 102 (Position 1) or to a constant voltage source such as ground (Position 2).

Some prior art active-matrix electro-optic displays (see for example the aforementioned U.S. Pat. No. 7,176,880) make use of capacitor electrodes which form capacitors with the pixel electrodes and which are electrically connected to the (front) light-transmissive electrode through metal traces on the periphery of the backplane. This type of connection is desirable in the first driving mode of the display of the present invention because it eliminates undesirable voltage transients across the display pixels that occur whenever the voltage on the top plane and the voltage on the capacitor electrodes do not track each other faithfully.

However, such an electrical connection between the front electrode 102 and the capacitor electrodes 110 and 112 is detrimental in the second driving mode of the present display because when the capacitor electrodes are electrically tied to the front plane electrode, time variation of voltages applied to the front electrode 102 will lead to a near matching voltage variation on the pixel electrodes 106 and 108, because of capacitive coupling between the pixel electrodes 106 and 108 and the capacitor electrodes 110 and 112 for voltage variations occurring at frequencies significantly larger than a critical frequency defined below. When the pixel electrode voltages closely track the front electrode voltage, the voltage drop across the electro-optic material 104 is nearly zero, so there is unlikely to be a strong change in optical state of electro-optic layer 104 resulting from variations in the voltage applied to the front electrode 102. Essentially, the front electrode voltage changes are defeated by matching voltage changes on the capacitor electrodes.

If, however, in accordance with the second driving mode of the present electro-optic display and method, the capacitor electrodes 110 and 112 are tied to a constant voltage such as a circuit ground or a "Vcom" voltage (a voltage shifted from ground to compensate for gate-pixel voltage kickback; see U.S. Pat. No. 7,034,783), rapid variations in the voltage applied to the front electrode 102 can induce large voltage drops between the front electrode 102 and the pixel electrodes 106 and 108 (i.e., can produce large voltages across the electro-optic layer 104) and can therefore induce substantial change in optical state of electro-optic layer 104. In this case, each storage capacitor holds the voltage of its pixel electrode nearly constant when the front electrode voltage varies, because the storage capacitance is much larger than the pixel capacitance (defined, for example, by pixel electrodes 106 and 108 and the front electrode 102). For example, if the pixel capacitance is 50 fF and the pixel storage capacitor is 3 pF, neglecting other parasitic capacitances to the pixel electrode, the pixel electrode will track only about (50 fF/(50 fF+3 pF))=1.6% of the variation of the front electrode. This leaves about 98.4% of the voltage variation between the front electrode and the pixel electrode, i.e, across the electro-optic layer 104. (This calculation neglects small pixel voltage shifts due to resistive coupling between each pixel electrode and the front electrode.)

In the display 100 shown in FIG. 1, a switch (120 in FIG. 1) is introduced into a conductive line 122 that leads from the capacitor electrodes. This switch 120 ties the capacitor electrodes of the pixel storage capacitors to either (a), in Position 1, the front electrode voltage supply line 124 or (b), in Position 2, a constant voltage (typically ground or a value matching the top plane voltage before applying a switching waveform (commonly referred to as "Vcom")).

The operation of the switch 120 in the dual mode driving method of the present invention is as follows. The switch 120 is held in Position 1 in order to hold the capacitor electrodes at the same voltage as the front electrode and to permit driving of the display in the first (DC) mode as defined above. The switch is held in Position 2 in order to hold the capacitor electrodes at a constant voltage (such as ground or Vcom) in order to permit driving in the second (AC) mode as defined above. During second mode driving, the pixel electrode voltages will be held nearly constant because, as described above, the storage capacitance is much larger than the pixel capacitance (between the pixel electrode and the front electrode) and also much larger than other so-called parasitic capacitances between each pixel electrode and other nearby electrodes such as a source line. To be precise, because of pixel capacitance and other parasitic capacitances, the pixel electrode voltages will lift off from a constant value when the front electrode voltage is varied, but this lift off will be small when, as mentioned, the pixel storage capacitance is large compared to other capacitances with the pixel electrode capacitance.

Resistive contact between the pixel electrodes and adjacent electrodes including the front electrode and adjacent pixel electrodes will cause the pixel voltage not to stay constant. However, for rapidly-varying front electrode voltages, the voltage liftoff from a constant value will be small. Here, a front electrode voltage is considered to be "rapidly varying" when important frequencies making up the front electrode voltage are much larger than the inverse of a "pixel relaxation time." This pixel relaxation time is given by the product of the sum of the capacitances experienced by a pixel electrode (mostly, this is the storage capacitor) and the harmonic sum of the resistances between the pixel electrode and the front electrode and neighboring pixels and the pixel transistor "off state" resistance. For ease of calculation, this harmonic sum of resistances is approximately the resistance between the pixel electrode and the front electrode (for a well-designed display), as this resistance is typically the smallest among the resistive couplings to other conductors.

Figure 2:
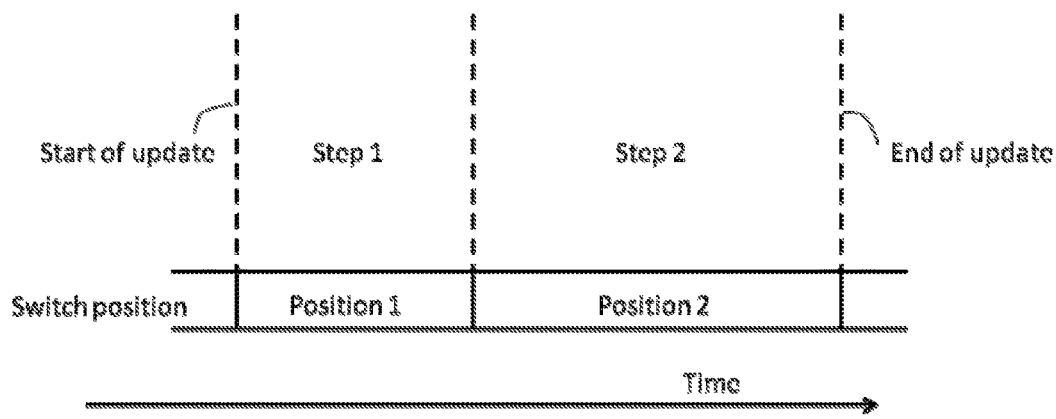
FIG. 2 is a graphical representation of a two stage display driving of the present invention.

FIG. 2 is a graphical representation of a dual mode driving method of the present invention which can be carried out by the display 100 shown in FIG. 1. Although a two-stage image update is shown in FIG. 2, it will be apparent to one of ordinary skill in the art that an image update may comprise any number of stages, provided that in at least one stage the switch 120 is in its first position and in at least one other stage the switch 120 is in its second position. In Stage 1 as illustrated in FIG. 1, the switch 120 for the capacitor electrode is in Position 2 (as defined above with reference to FIG. 1). A global time-varying voltage is applied to the imaging electro-optic layer 104 through modulation of the voltage applied to the front electrode 102 (i.e., according to the second display driving mode as described above). In Stage 2, the switch for the pixel storage capacitor counter electrode 120 is in Position 1. Voltages are applied to the various pixel electrodes as defined by the initial and final image, and the desired waveform, by means of gate driver controlled line-by-line scanning using the thin film transistor array as described above (i.e., according to the first display driving mode as defined above).

The update sequence depicted in FIG. 2 is provided as an example for illustrative purposes only. More complex sequences can be readily imagined by extension of this simple example. In the illustrated sequence, an image update occurs in two stages. In Stage 1, the display may for example be driven globally to a known optical state by application of a high-frequency, sinusoidal or square wave voltage applied to the front electrode. During Stage 1, the switch 120 controlling the capacitor electrodes is in Position 2 (see FIG. 1). At the end of Stage 1, the switch 120 is changed to Position 1. In the subsequent Stage 2, the pixel electrodes are charged to various values in accordance with a waveform drive scheme and the initial and final images. The pixel charging in Stage 2 is achieved through the standard active-matrix scanning of the backplane.

It should be understood that the voltage on the capacitor electrodes is held constant during drive when the switch controlling these electrodes is in Position 1 as stated earlier. However, this voltage is not expected to stay constant before and after the end of the update. For example, it may be convenient or desirable to have this electrode voltage move with the "Vcom" voltage that is used to drive the front electrode when the display is not being switched through variation of the front electrode voltage. Typically, this Vcom voltage is brought to a non-zero value when beginning backplane scanning in the first display driving mode, and allowed to relax to zero at the end of backplane scanning More than one front electrode may employed in a display, in which case more than one switch (exemplified by switch 120 in FIG. 1) may be required. Likewise, although an update sequence in which switch 120 was shown in FIG. 2 to follow a temporal progression in which the switch was held in Position 2 prior to Position 1, this is not a requirement of the invention. It is also not necessary that, in the second display driving mode, the varying voltage be applied to the front electrode while the capacitor electrodes are maintained at a constant voltage. The present invention merely requires that the potential difference between the front electrode and the capacitor electrodes be varied, so that, at least in principle, the varying voltage could be applied to the pixel electrodes while the front electrode is kept at a constant voltage.

Figure 3:
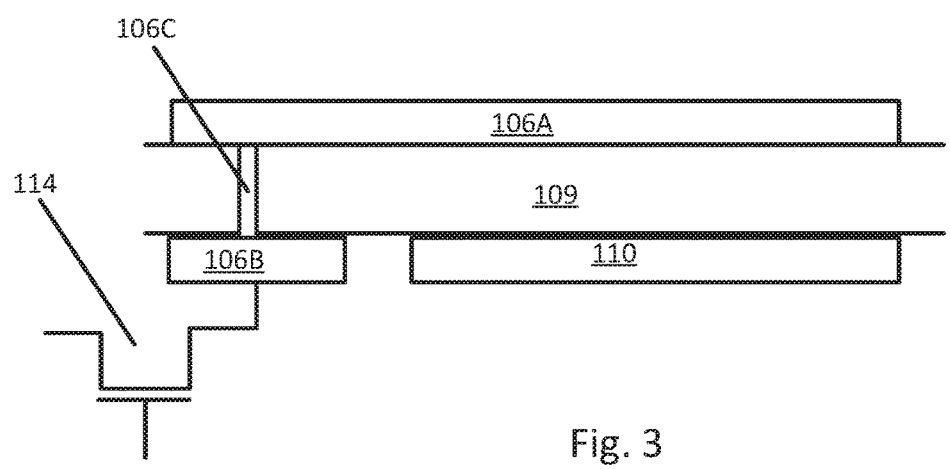
FIG. 3 is an enlarged schematic cross-section through a pixel electrode and associated capacitor electrode which may be substituted for those shown in FIG. 1.

FIG. 3 is an enlarged schematic cross-section through a pixel electrode and associated capacitor electrode which may be used in place of those shown in FIG. 1. As may be seen from FIG. 3, the drain of transistor 114 is connected directly to a second portion 106B of a pixel electrode. The pixel electrode has a first portion 106A, which lies adjacent a layer of electro-optic material 104 (FIG. 1) and on the opposed side of a layer 109 of dielectric material from the second portion 106B, the two portions 106A and 106B being interconnected by a conductive via 106C passing through the layer 109 of dielectric material. Capacitor electrode 110 lies adjacent the second portion 106B of the pixel electrode and forms a capacitor with first portion 106A of the pixel electrode.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic display comprising:
   a layer of electrophoretic material comprising a plurality of electrically charged particles disposed in a fluid and capable of moving through the fluid under the influence of an electric field;
   at least one light-transmissive electrode disposed on one side of the layer of electro-optic material;
   a plurality of pixel electrodes disposed on the opposed side of the layer of electro-optic material from the at least one light-transmissive electrode;
   a plurality of capacitor electrodes, each capacitor electrode being associated with one of the plurality of pixel electrodes such that the pixel electrode overlaps with a portion of its associated capacitor electrode to form a capacitor; and
   switching means having a first position in which each capacitor electrode is electrically connected to the light-transmissive electrode for reducing voltage transients across the layer of electrophoretic material and a second position in which each capacitor electrode is electrically connected to a first voltage source having a voltage independent of the voltage on the light-transmissive electrode; and
   a second voltage source for applying an alternating voltage to the light-transmissive electrode while the switching means is in its second position.

2. An electro-optic display according to claim 1 wherein each pixel electrode is connected to the drain of a transistor that is also connected to a source line and a gate line.

3. An electro-optic display according to claim 1 further comprising a layer of dielectric material and wherein each pixel electrode is in two portions lying on opposed sides of the layer dielectric material, a first portion lying adjacent the layer of electro-optic material, and a second portion connected to the drain or source of an associated transistor, and connected to the first portion by means of a conductive via passing through the layer of dielectric material.

4. An electro-optic display according to claim 1 wherein the electro-optic material comprises a rotating bichromal member, electrochromic or electro-wetting material.

5. An electro-optic display according to claim 1 wherein the electrically charged particles and the fluid are confined within a plurality of capsules or microcells.

6. An electro-optic display according to claim 1 wherein the electrically charged particles and the fluid are present as a plurality of discrete droplets surrounded by a continuous phase comprising a polymeric material.

7. An electro-optic display according to claim 1 wherein the fluid is gaseous.

8. An electronic book reader, portable computer, tablet computer, cellular telephone, smart card, sign, watch, shelf label, variable transmission window or flash drive comprising a display according to claim 1.

9. A method for addressing an electro-optic display comprising:
a layer of electrophoretic material comprising a plurality of electrically charged particles disposed in a fluid and capable of moving through the fluid under the influence of an electric field;
at least one light-transmissive electrode disposed on one side of the layer of electro-optic material;
a plurality of pixel electrodes disposed on the opposed side of the layer of electro-optic material from the at least one light-transmissive electrode;
a plurality of capacitor electrodes, each capacitor electrode being associated with one of the plurality of pixel electrodes such that the pixel electrode overlaps with a portion of its associated capacitor electrode to form a capacitor; and
switching means having a first position in which each capacitor electrode is electrically connected to the light-transmissive electrode for reducing voltage transients across the layer of electrophoretic material and a second position in which each capacitor electrode is electrically connected to ground for inducing large voltage drops across the layer of electrophoretic material to induce optical changes, the method comprising:
(i) with the switching means in its first position, applying a voltage to the capacitor electrode such that the capacitor electrode and the light-transmissive electrode are at substantially the same potential; and
(ii) with the switching means in its second position, applying ground voltage to the capacitor electrode such that the light-transmissive electrode and the capacitor electrode are not at the same potential,
wherein, in step (ii) of the method, an alternating voltage is applied to the light transmissive electrode.

10. A method according to claim 9 wherein each pixel electrode is connected to the drain of a transistor that is also connected to a source line and a gate line.

11. A method according to claim 10 wherein, in step (i) of the method, the voltage is applied to the pixel electrode through the transistor via the source line.

* * * * *